United States Patent [19]

Tabata

[11] 4,365,249

[45] Dec. 21, 1982

[54] LINE MONITORING DEVICE IN TWO-WAY DATA COMMUNICATION SYSTEM

[75] Inventor: Toshio Tabata, Tokyo, Japan

[73] Assignee: Pioneer Electronic Corporation, Tokyo, Japan

[21] Appl. No.: 191,782

[22] Filed: Sep. 29, 1980

[30] Foreign Application Priority Data

Sep. 29, 1979 [JP] Japan .................................. 54-125992

[51] Int. Cl.³ .......................... H04Q 9/00; H04B 1/00; H04N 7/00
[52] U.S. Cl. .................................. 340/825.3; 358/84; 455/2; 179/175.3 R
[58] Field of Search ............... 375/46, 97, 98; 370/55; 455/2; 358/84; 340/147 R, 149 R, 825, 825.3; 179/175.3 R

[56] References Cited

U.S. PATENT DOCUMENTS

| | | | |
|---|---|---|---|
| 2,735,904 | 2/1956 | Sclonczewski | 179/175.3 R |
| 3,790,700 | 2/1974 | Callais et al. | |
| 3,917,916 | 11/1975 | Ghosh et al. | 179/175.31 R |
| 3,944,742 | 3/1976 | Cunningham | 455/2 |
| 4,055,733 | 10/1977 | Holsinger et al. | 179/175.3 R |
| 4,145,656 | 3/1979 | Merryman et al. | 455/62 |
| 4,160,134 | 7/1979 | Carroll | 179/175.3 R |
| 4,162,483 | 7/1979 | Entenman | 340/147 R |
| 4,207,431 | 6/1980 | McVoy | 179/175.3 R |
| 4,216,497 | 8/1980 | Ishman et al. | 455/2 |
| 4,245,245 | 1/1981 | Matsumoto et al. | 455/2 |

Primary Examiner—Donald J. Yusko
Attorney, Agent, or Firm—Sughrue, Mion, Zinn, Macpeak & Seas

[57] ABSTRACT

A line monitoring device for use in a two-way data communication system such as a CATV system in which up-signals are transmitted by terminal units in response to retrieving signals applied thereto from a central facility to monitor the levels produced by the various terminal units. An address detection signal compares the address number included in a polling down-signal from the central facility with an address pre-stored in the monitoring device. A response signal detection section detects the up-signals from the terminal units. A display section operates in response to the address detection section to display the level of an up-signal from a terminal unit as produced on the output of the response signal detection section when the address received from the central facility coincides with the pre-stored address.

7 Claims, 5 Drawing Figures

LINE MONITORING DEVICE IN TWO-WAY DATA COMMUNICATION SYSTEM

BACKGROUND OF THE INVENTION

The present invention relates to a two-way data communication system in which data communication is carried out between a central facility, hereinafter referred to as "a center", and a plurality of terminal units. More particularly, the invention relates to a line monitoring device in a CATV system, in which two-way data communication is carried out, which monitors the levels of data signals which are transmitted from the terminal units to the center, hereinafter referred to as "up-data signals" or "up-signals", when applicable.

In general, in a CATV system, the center is connected through cables to the terminal units provided in subscribers' homes so that television signals received by the center or television signals of programs produced by the center are transmitted through the cables to the television sets in the subscribers' homes. This system is considerably advantageous in that, since the center is connected through lines or cables to the terminals units as described above, data can be transmitted between the center and the terminal units, and not only are television signals transmitted to the television sets in the subscribers' homes, but also the system has a wide range of applications.

In such a CATV system which is capable of carrying out two-way data communications, the center is connected through lines or cables to the various terminal units so that the center can receive data signals from the terminal units and vice versa. In order to carry out two-way data communication satisfactorily, it is essential that the terminal units operate satisfactorily. Accordingly, it is necessary to monitor the levels of data signals on the lines at all times. Heretofore, the levels of data signals on the lines were monitored according to a method in which pilot signals are applied to the lines of the CATV system and the levels of the received pilot signals are monitored.

However, that method is not economical because the provision of a special device is necessary to apply pilot signals to the lines and a separate frequency or frequencies as well as time are required for monitoring the levels of data signals on the lines.

SUMMARY OF THE INVENTION

In view of the foregoing, an object of the present invention is to provide a line monitoring device in a two-way data communication system in which up-signals which are transmitted by the terminal units in response to retrieving signals applied thereto from the center are monitored thereby to monitor the lines.

More specifically, these as well as other objects of the invention are met by a line monitoring device for use in a two-way data communication system for carrying out data communications between a central facility and a plurality of terminal units including an address detection section for comparing an address included in a polling down-signal from the central facility with a pre-stored address, a response signal detecting section for detecting up-signals from the terminal units, and a display section operating in response to the address detection section and to the response signal detecting section to display the level of an up-signal from a terminal unit whose address coincides with the pre-stored address.

Preferably, the address detection section includes a high-pass filter in a distributor and an FSK receiver which produces digital outputs in response to signals including address signals on a branch cable of the communication system. A comparison device compares an address set with digital switches with the digital outputs of the FSK receiver. In the response signal detecting section, the output of a low-pass filter is coupled through a switchable attenuator to an amplifier and detector to a peak detector circuit. The output of the peak detector circuit is coupled through an analog-to-digital converter the outputs of which operate a digital display. The comparison output of the comparison device operates the peak detector and analog-to-digital converter.

DESCRIPTION OF THE PREFERRED EMBODIMENTS

Figure 1:
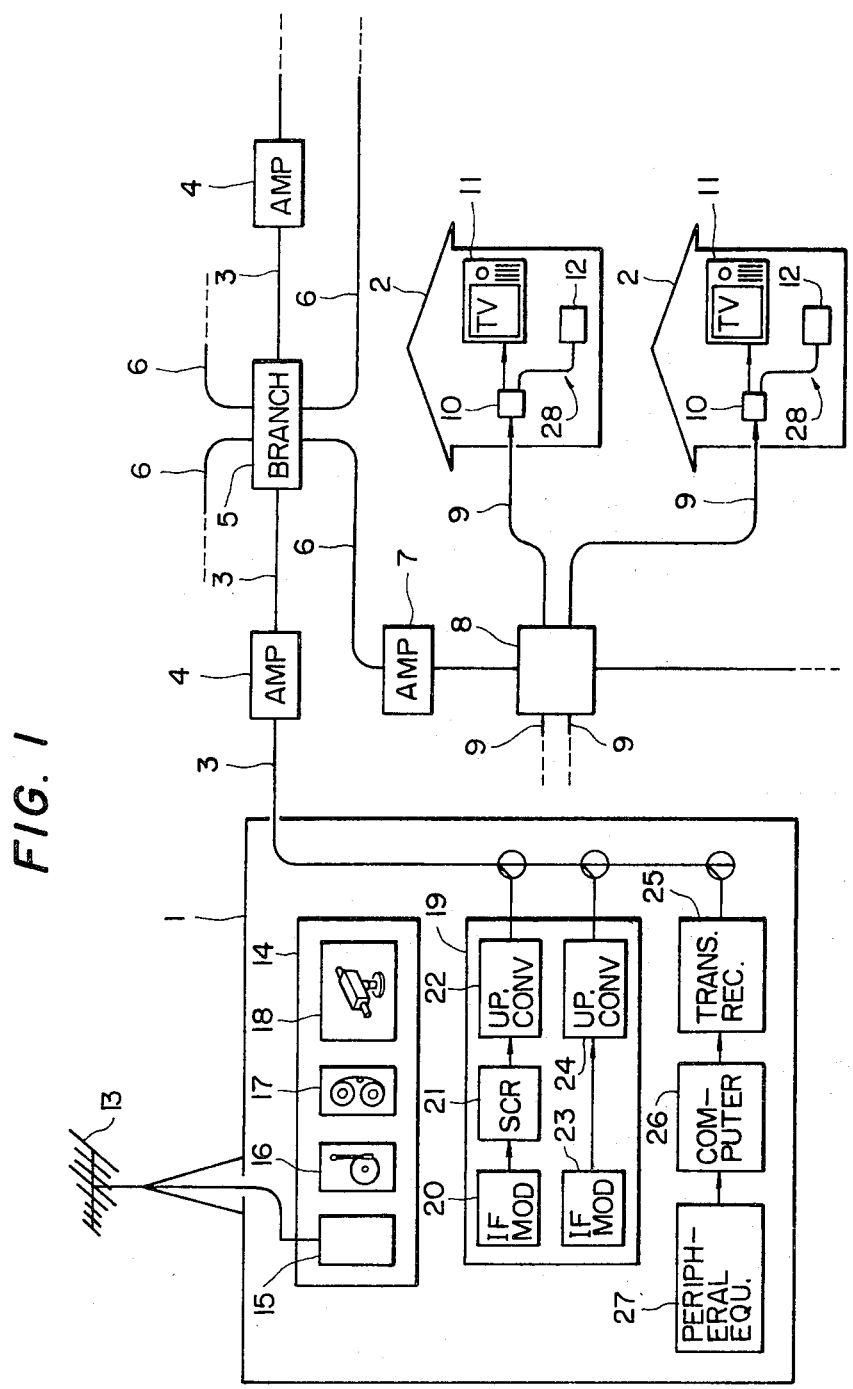
FIG. 1 is an explanatory diagram showing a CATV system.

A CATV system of the invention will be described with reference to FIG. 1. The CATV system includes a single center 1 and terminal units 28 which are provided, for example, in several tens of thousands of subscribers' homes. The center 1 is connected through coaxial cables to the terminal units 28 in the subscribers' homes 2. A main cable 3 extends from the center 1 and main cable amplifiers 4 and branching units 5 are provided at predetermined positions on the main cable 3. A plurality of branch cables 6 extend from each branching unit 5. Extension amplifiers 7 and tap-off units 8 are provided at predetermined points on the branch cables 6. Each tap-off unit 8 is connected to branch lines 9 which extend to the terminal units 28 in the subscribers' homes 2. Each terminal unit 28 includes a main unit 10, a television set 11 and a control unit 12. The branch line 9 is connected to the main unit 10 which is in turn connected to the television set 11 and to the control unit 12. As is apparent from the above description, the main cable extending from the center is branched into a first plurality of branch cables which are further branched into a second plurality of branch lines which are finally connected to the terminal units 28.

A signal receiving antenna 13 is installed outside the center 1. The antenna 13 is connected to a demodulator 15 in a source group 14 in the center 1. The source group 14 further includes a video disc player 16, a video tape recorder 17 and a studio 18. The output signals of the source group 14 are applied to a modulation output section 19 composed of two systems. One of the two systems includes an IF modulator circuit 20, a scramble circuit 21, and an up-converter circuit 22 while the other system includes an IF modulator circuit 23 and an up-converter circuit 24. The outputs of the up-converters 22 and 24 are connected to the main cable 3 to which a data transceiver 25 is connected for data communication between the center 1 and each main unit 10. The data transceiver 25 is connected to a computer 26 which is connected to a peripheral unit 27 such as a printer or a display unit.

The operation of the CATV thus constructed will be described.

First, the power switch of the television set 11 is turned on. With the television set 11 set to a particular unused channel, the control unit 12 is operated so that the frequency of a desired channel to be received is converted into that of the unused channel. The channels which can be selected by the control unit 12 as described above can be classified into three groups of channels for (A) retransmission programs in which television signals from local station are received without modification, (B) independent programs (free of charge), and (C) chargeable programs. Each group is allocated ten channels, and therefore any of thirty channels can be selected by operating the control unit 12.

(A) Retransmission programs

Television signals received by the antenna 13 are demodulated by the demodulator 15 and then applied to the modulation output section 19. The signal thus applied is modulated by the IF modulator circuit 23. The frequency of the signal thus modulated is increased to a predetermined frequency by the up-converter circuit 24 according to a determined frequency allocation scheme. That is, it is assigned to a predetermined channel. The resultant signal is applied through the main cable 3, the branch cable 6, and the branch line 9 to the television sets 11.

(B) Independent programs

The independent programs include weather forecast programs, news programs, and the like. In the case of programs recorded by the video disc player 16 or the video tape recorder 17 or in the case of live programs produced in the studio 18, the video signal is modulated by the IF modulator circuit 23 and the frequency of the signal thus modulated is increased to that of a predetermined channel by the up-converter circuit 24. The resultant signal is applied to the main cable 3. Reception of these programs is free of charge irrespective of the number of times of program reception and the period of time used for program reception. That is, the programs can be received for the basic monthly charge which is paid by the subscriber.

(C) Chargeable programs

The chargeable programs include new movie programs, special programs, and the like. In the case of programs provided by the video disc player 16 or the video tape recorder 17 or in the case of live programs produced in the studio 18, the video signal is modulated by the IF modulator circuit and is then processed by the scrambler circuit 21 so that they cannot be reproduced without special signal processing. Then, the frequency of the signal is increased to that of a predetermined designated channel, and is then applied to the main cable 3. In order to receive the chargeable programs, the video signal must be descrambled by the main unit 10 in the subscriber's home 2 so that a regular image appears in the television set 11. The subscriber is charged for the reception of the chargeable programs. That is, predetermined charges are summed, and he is requested to pay a special charge at a measured rate in addition to the monthly basic charge.

As described above, the center 1 is connected through the coaxial cables to the terminal units in the subscribers' homes 2. However, in order to charge the subscribers for the reception of the chargeable programs, it is absolutely necessary to detect which subscribers receive which channels. That is, it is necessary to detect the channels which have been selected by the subscribers at various times. In order to meet this requirement, the data transceiver 25 outputs a retrieving signal at predetermined time intervals so that the terminal units 28 are called with their assigned address numbers. That is, the channels received by the terminal units at the time of transmission of the retrieving signal are detected, this operation being referred to as "polling". In response to this polling, each terminal unit 28 answers the data transceiver 25 with data representative of the channel which was received by the terminal unit at the time of polling. Various reception and transmission data for the data transceiver 25 are arranged and stored by the computer 26 and are displayed or printed out by the peripheral unit 27. The polling operation is carried out at predetermined time intervals of several seconds to several tens of second and therefore audience ratings can be readily calculated.

Sometimes, the subscribers may participate in the production of programs. In this case, by operating the control units 12, they can answer to the programs while watching the television sets 11. The answers are transmitted through the coaxial cables to the center 1.

Figure 2:
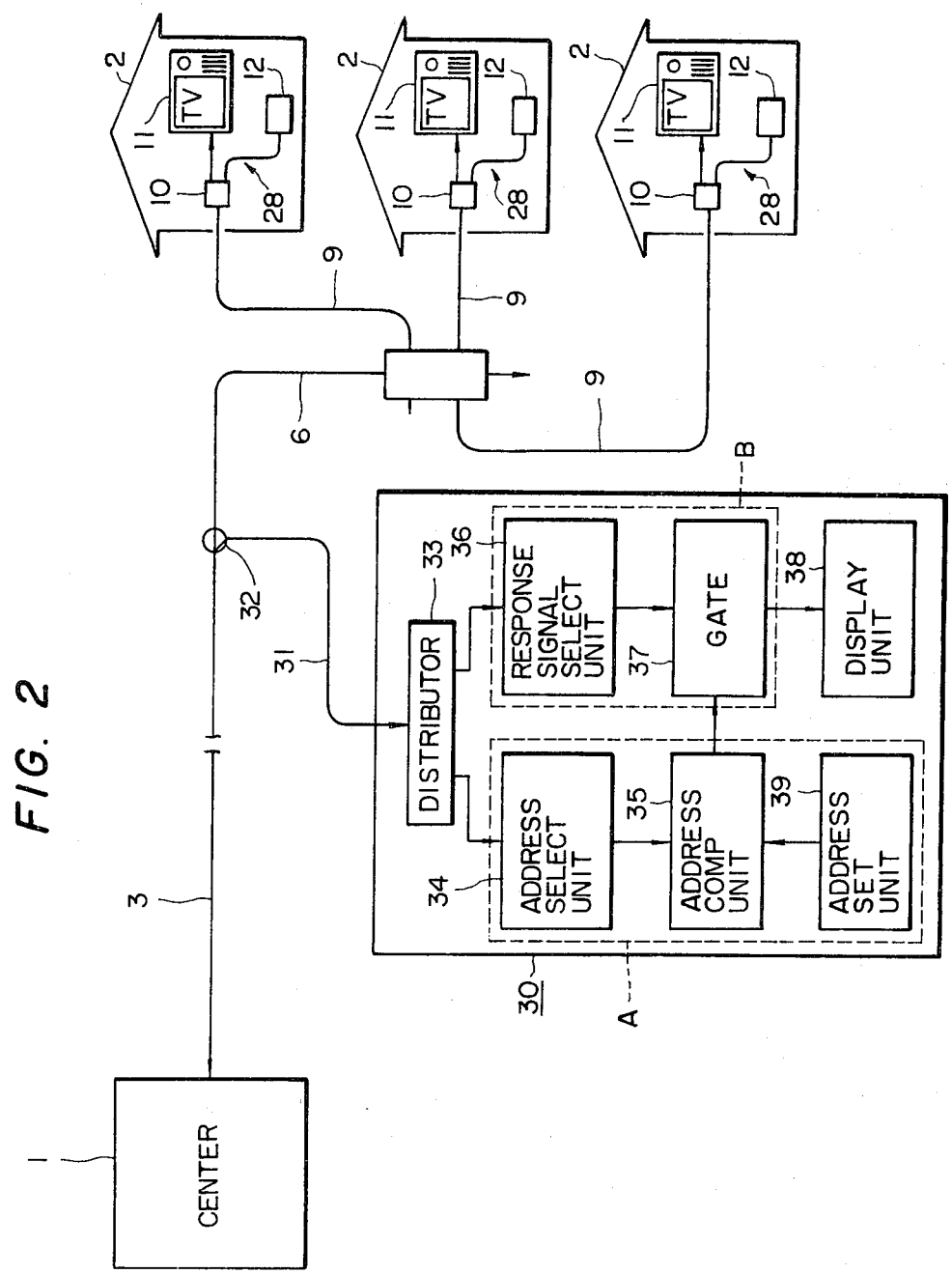
FIG. 2 is a block diagram showing a preferred embodiment of a line monitoring device according to the invention.

FIG. 2 shows an example of a line monitoring device according to the invention. The line monitoring device 30 is connected through a cable 31 to a connector 32 provided on the branch cable 6. The connector 32 is one of those which are provided at various points along the main cable and the branch cables 6. The connector 32 is of a plug-in type and can therefore be freely connected to and disconnected from the cable. The cable 31 is connected to a distributor 33 in the line monitoring device 30. The distributor 33 is connected to a address selection unit 34 and to a response signal selection unit 36. The address selection unit 34 is connected to an address comparison unit 35 the output of which is connected to a gate 37. The output of the gate 37 is connected to a display unit 38. The response signal selection unit 36 is also connected to the gate 37. The address comparison unit 35 is coupled to an address unit 39.

The address selection unit 34, the address comparison unit 35 and the address unit 39 form an address detection section (A). The response signal selection unit 36 and the gate 37 form a response signal sorting section (B).

The operation of the line monitoring device thus contructed will be described.

The center 1 polls the terminal units 28 at predetermined time intervals to confirm the conditions of operation of the terminal units 28. Each terminal unit 28 has its own address number. An address number and a down-signal (FSK signal) are transmitted from the center 1 to call the terminal unit 28 to which a particular address number has been assigned. The terminal unit 28 thus called sends an up-signal (PSK signal) to the center 1 in response to the calling. This retrieving operation is called out for all of the terminal units 28 to confirm the conditions of operation thereof.

As described above, a center 1 is connected to a number of branch cables and lines to a number of terminal units 28. The terminal units 28 are divided into a number of groups each composed of several to several tens of terminal units 28. The cable 31 is plugged into the connector 32 which is located near the branching point of the group of terminal units 28 to be monitored so that the line monitoring device 30 is connected to the relevant branch cable 6. Then, the address number of a terminal unit 28 to be monitored is set in the address unit 39.

Upon transmission of the polling down-signal from the center 1 to the terminal units 28, the down-signal is applied to the line monitoring device 30 as well as each terminal unit 28. As described above, the terminal unit 28 is operated only when the down-signal including an address number assigned thereto is applied, the terminal unit responding by sending an up-signal to the center 1. The down-signal applied to the line monitoring device 30 is applied through the distributor 33 to the address selection unit 34 where the address number is separated from the polling signal and is then applied to the address comparison unit 35. In the address comparison unit 35, the address number thus applied is compared with an address number pre-stored in the address set unit. When the two coincide, a signal is applied to the gate 37 to open the gate 37. The up-signals are applied from the terminal units 28 through the distributor 33 and the response signal selection section 36 to the gate 37 at all times. Therefore, when the gate 37 is opened as described above, only the up-signal from the terminal unit 28 of the address number which coincides is allowed to pass through the gate 37 and the output level of the up-signal is displayed on the display unit 38. As the address number in the polling down-signal coincides with the address number stored in the address unit 39, the gate 37 is maintained open until an address number is next called by a down-signal. Thus, the problem of up-signals from the terminal units 28 having address numbers other than that set in the address set unit 39 passing through the gate 37 to create erroneous displays is prevented.

As is clear from the above description, it can be immediately determined through the display unit 38 whether or not the terminal units 28 are being operated at a normal output level. All of the terminal units 28 or selected ones can be monitored by setting the address numbers thereof successively in the address unit 39.

Figure 3:
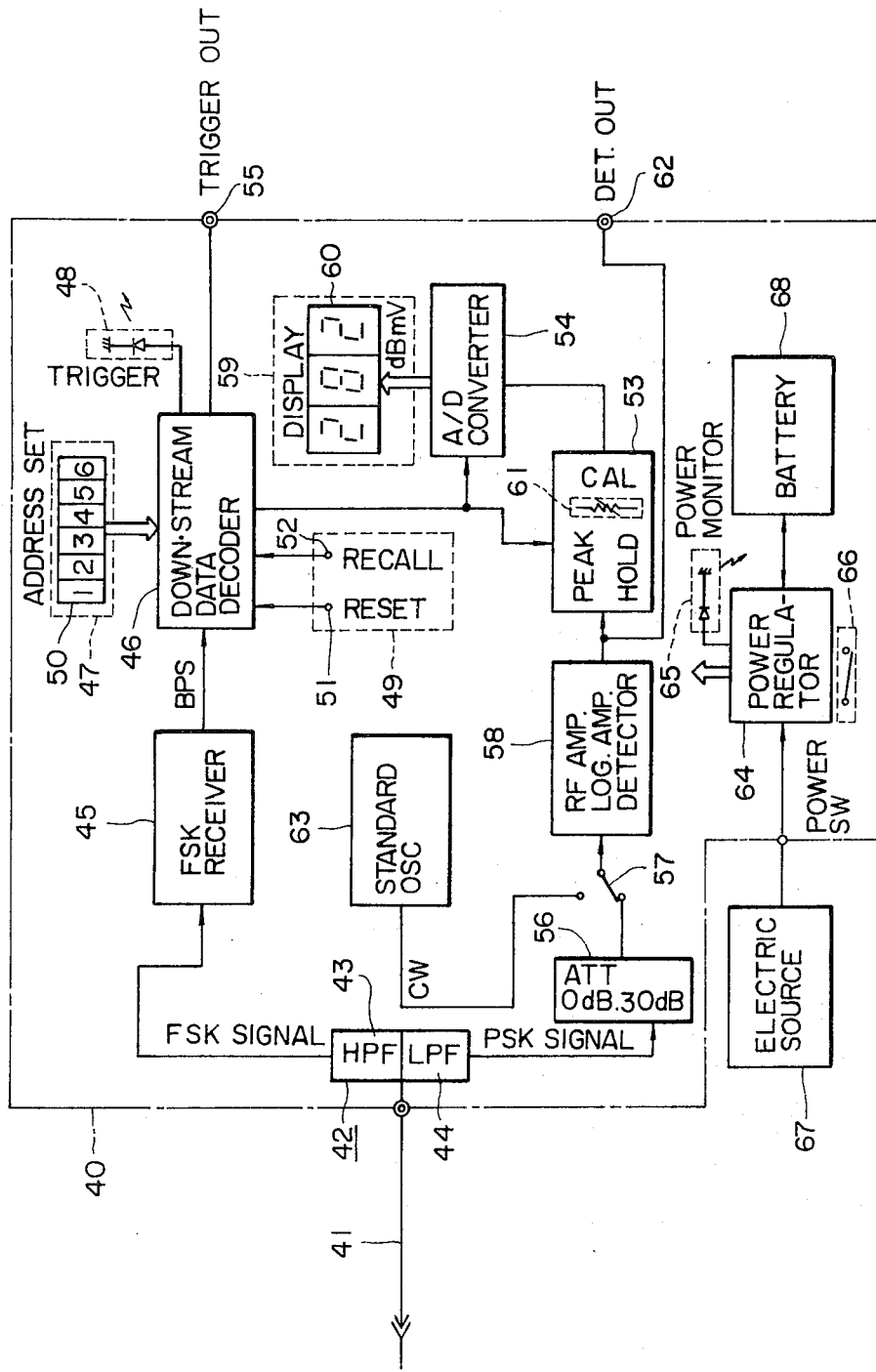
FIG. 3 is a block diagram showing an example of the line monitoring device according to the invention.
Figure 4:
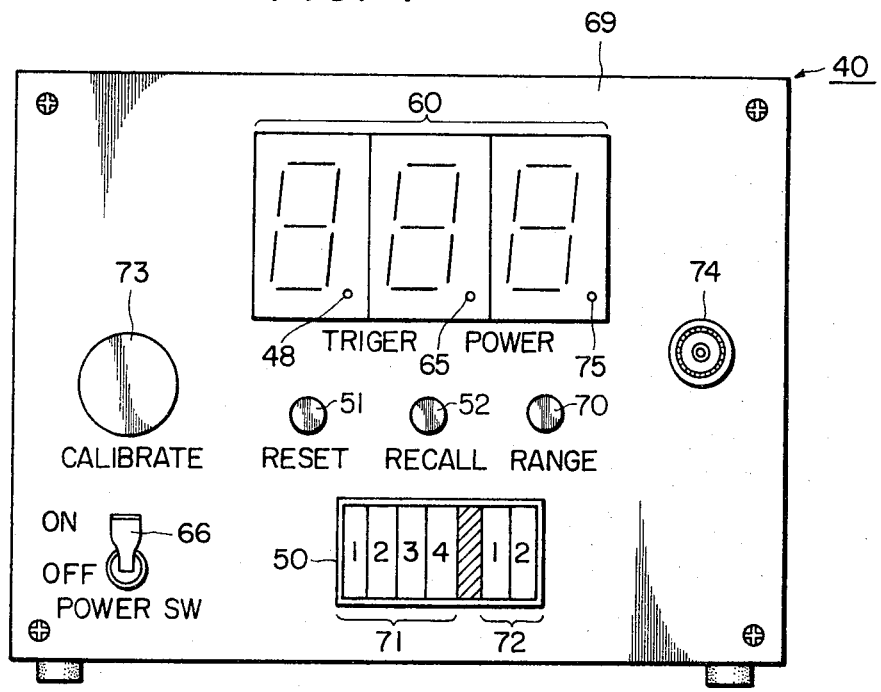
FIGS. 4 and 5 are a front view and a rear view of the line monitoring device shown in FIG. 3, respectively.
Figure 5:
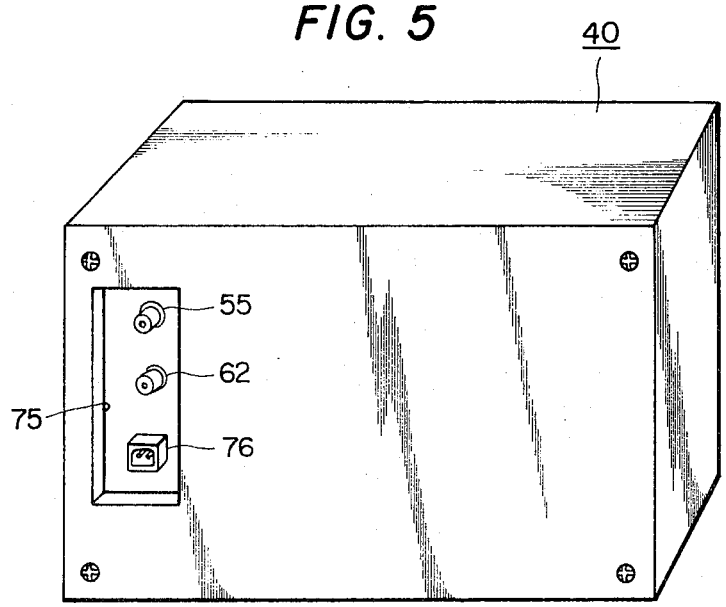

FIGS. 3 through 5 show a specific example of a line monitoring device according to the invention.

The line monitoring device 40 is connected through a cable 41 to the aforementioned connector. The cable 41 is connected to a distributor 42 in the device 40. The distributor 42 includes a high-pass filter 43 and a low-pass filter 44. The high-pass filter 43 is connected to a down-signal receiving unit 45 which is connected to a down-signal decoding unit 46. The decoder 46 is connected to an address set unit 47, a trigger LED 48 and an operating unit 49. The address set unit 47 is formed by an address switch assembly 50. The operating unit 49 includes a reset button 51 and a recall button 52. The output of the down-signal decoding unit 46 is connected to a peak detector 53 and an analog-to-digital (A/D) converter 54 and is further connected to a trigger output terminal 55.

The low-pass filter 44 of the distributor 42 is connected through a range change-over unit 56, which attenuates the signal by an amount settable by a control thereof, and a change over switch 57 to a logarithmic amplifier detector unit 58. The output of the unit 58 is connected through the peak detector 53 to the A/D converter 54 the output of which is connected to a digital display unit 59. The digital display unit 59 has a three-figure LED display element 60. The peak detector 53 has a calibration circuit 61. The output of the amplifier detector unit 58 is connected to a detection output terminal 62. The change-over switch 57 is connected to a reference oscillator 63.

A power source 64 is provided to supply current to the line monitoring device 40. The power source 64 is connected to a power LED 65 and a power switch 66 and is further connected to an external electric source 67 and an internal battery 68 which can be recharged.

FIG. 4 shows a front view of the line monitoring device 40. The three-figure LED display element 60 is provided at the central region of the upper half of the front panel 69 of the device 40. In the display element 60, the hundreds dot is the trigger LED 48, the tens dot is the power LED 65, and the units dot is a monitor LED 75. The reset button 51, the recall button 52 and a range button 70 are provided at suitable intervals below the LED display element 60. The address switch assembly 50 is provided below these buttons. The range button 70 is adapted to operate the range change-over unit 56. The address switch assembly 50 is used to set an address number in decimal notation and it is divided into a group address section 71 and a private address section 72. A knob 73 which is operated in association with the calibration circuit 61 and the change-over switch 57 is provided at the center of the left-hand side of the panel 69. The power switch 66 is disposed below the knob 73. A connector 74 which is coupled to the distributor 74 is provided at the center of the right-hand side of the panel 69.

FIG. 5 shows the rear side of the line monitoring device. The trigger output terminal 55, the detection output terminal 62 and a power socket 76 are provided in a recess 75 formed in the rear side of the device 40.

The operation of the line monitoring device 40 thus constructed will be described.

The cable is connected to the connector 74 so that the distributor 42 is coupled to the line (branch cable 6). Then, the power switch 66 is turned on as a result of which the power LED 65 is turned on to show that the normal voltage is applied to the monitoring device. If the power LED 65 is not turned on or flickers, then the voltage is low. In this case, it is necessary to connect the external electric source 67 to the power socket 76 to charge the internal battery. Then, the address number of a terminal unit 28 to be monitored is set by operating the address switch assembly 50. In this case, the group address section 71 of the address switch assembly 50 is used to designate the group of the terminal unit while the private address section 72 is used to designate a particular terminal unit in the group.

After the address number is set as described above, the monitoring device is held as it is for several to several tens of seconds. The down-signal (FSK signal) from the center 1 is applied through the high-pass filter 43 and the down-signal receiving unit 45 to the down-signal decoding unit 46. If the set address number is included in the polling down-signal, the trigger LED 48 is turned on for 0.5 second by the decoding unit 46 while a control signal is applied to the peak detector 53 and the A/D converter 54 from the decoding unit 46. The up-signal (PSK signal) is applied through the range change-over unit 56 and the change-over switch 57 to the amplifier-detector unit 58 where it is rectified into a DC signal which is applied to the peak detector 53. The level data of the up-signal detected when the control signal is applied from the down-signal decoding unit 46 as described above is held by the peak detector 53 and is then applied to the A/D converter 54. The level data thus applied is converted into digital data by the unit 54.

The digital data is displayed on the LED display element 60. The display of the digital data disappears in several seconds. This is to economically use the internal battery. However, the digital data can be read again by depressing the recall button 52.

When the trigger LED 48 is turned on by the down-signal decoding unit 46 as described above, a 5 V pulse voltage is applied to the trigger output terminal 55 and the output level of the amplifier-detector unit 58 is provided at the detection output terminal 62. Therefore, the aforementioned level data can be continuously measured on the cathode-ray tube of an oscilloscope by connecting the trigger output terminal 55 and the detection output terminal to the oscilloscope.

In order to allow the peak detector 53 to hold the level data when the trigger signal is applied by the down-signal decoding unit 46, the stored level value is eliminated by operating the reset button 51 when the stored level is no longer needed. However, where the address switch 47 is operated, the peak detector 53 is automatically reset and therefore in this case it is unnecessary to operate the reset button 51.

A display "HI" or "LO" on the LED display element 60 indicates that it is impossible to display the input up-signal level because the latter is too high or too low. In this case, it is necessary to change the measurement range by operating the range button 70. A low range of 0 to 30 dB and a high range of 30 to 60 dB are available. For ranges other than those, it is necessary to use a probe or a preamplifier.

The frequency of a down-signal can be calibrated by operating the calibrating knob 73. Upon depression of the knob 73, the change-over switch 57 is operated so that the amplifier-detector unit 58 is connected to the reference oscillator 63. The knob 73 has a clutch mechanism so that, when the knob 73 is depressed, the change-over switch 57 and simultaneously the knob 73 interlocks with the calibration circuit 61. As the knob 73 is turned while being depressed, the digits on the LED display element 60 are changed. Calibration can be achieved by turning the knob 73 until the LED display element 60 shows a value "30 (dB)" because a signal having a correct level value is applied from the reference oscillator 63. Upon completion of calibration, the knob 73 is released. As a result, the change-over switch 57 is automatically returned to its original position. Thus, the peak detector 53 has been adjusted to detect correct level values.

With the line monitoring device according to the invention constructed as described above, it is unnecessary to transmit special pilot signals for monitoring the levels of up-signals, and the up-signals from terminal units to be inspected can be correctly monitored utilizing the address numbers thereof. Furthermore, it is unnecessary to provide a line monitoring mechanism in the two-way data communication system. Thus, the CATV system can be maintained at low cost and with high accuracy.

What is claimed is:

1. A line monitoring device for use in a two-way data communications system for carrying out data communications between a central facility and a plurality of terminal units comprising:
   an address detection section for comparing a digital address included in a polling down-signal from said central facility with a pre-stored digital address;
   a response signal detecting section for detecting up-signals from said terminal units; and
   a display section operating in response to said address detection section and said response signal detecting section to display the level of an up-signal from a terminal unit whose address coincides with said pre-stored address.

2. The line monitoring device of claim 1 further comprising a distributor, said distributor having an input adapted to be coupled to a branch cable in said data communication system and said distributor having a first output coupled to said address detection section and a second output coupled to said response signal detecting section.

3. The line monitoring device of claim 1 wherein said display section comprises means for digitally displaying the level of an up-signal from said terminal unit whose address coincides with said pre-stored address.

4. The line monitoring device of claim 2 wherein said address detection section comprises an address selection unit having an input coupled to be the corresponding output of said distributor, an address set unit by which a selected address can be digitally set, and an address comparing unit for comparing the address set in said address set unit within an address outputted by said address selection unit.

5. The line monitoring device of claim 4 wherein said response signal detecting section comprises a response signal selection unit having an input coupled to the corresponding output of said distributor and gate means, said gate means coupled to be opened and closed by an output of said address comparing unit, said display section having an input coupled to the output of said gate means.

6. A line monitoring device for use in a two-way data communication system for carrying out data communications between a central facility and a plurality of terminal units comprising:
   a low-pass filter having an input coupled to an input terminal, said input terminal being adapted to be connected to a branch cable of said data communication system;
   a variable attenuator having an input coupled to an output of said low-pass filter;
   amplifier and detector means having an input coupled to an output of said attenuator;
   a peak detector circuit having an input coupled to an output of said amplifier and detector means;
   an analog-to-digital converter having a signal input coupled to an output of said peak detector;
   digital display means operating in response to digital outputs of said analog-to-digital converter;
   a high-pass filter having an input coupled to said input terminal;
   a digital demodulator having an input coupled to an output of said high-pass filter;
   digital switch means for setting in a selected address; and
   comparison means for comparing a digital address set in by said digital switch means with digital address data outputted by said receiver means, a comparison output of said comparison means being coupled to operate said peak detector and said analog-to-digital converter.

7. The line monitoring device of claim 6 further comprising a calibration oscillator and switch means for selectively coupling said input of said amplifier and detector to one of said oscillator and said attenuator.

* * * * *